Dec. 9, 1969  G. L. TRUAX  3,482,317
FOOTBALL POSITION INDICATOR
Filed Oct. 12, 1966  2 Sheets-Sheet 1
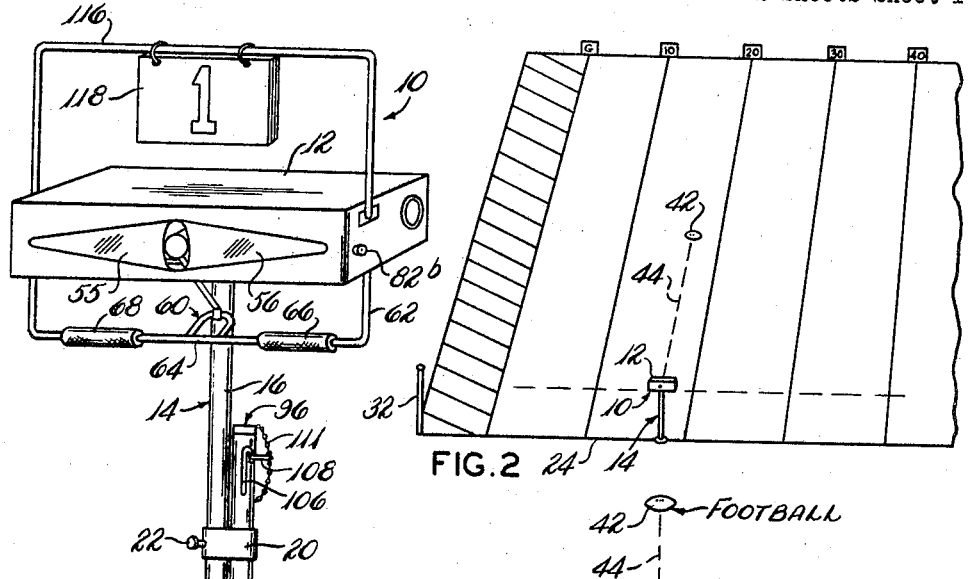
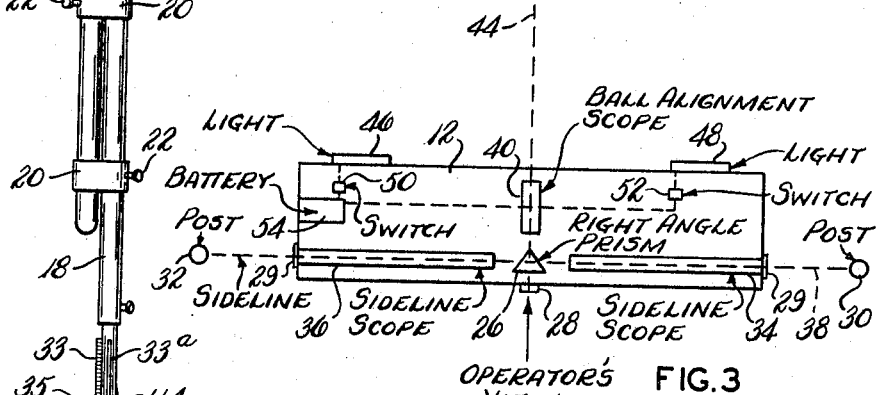
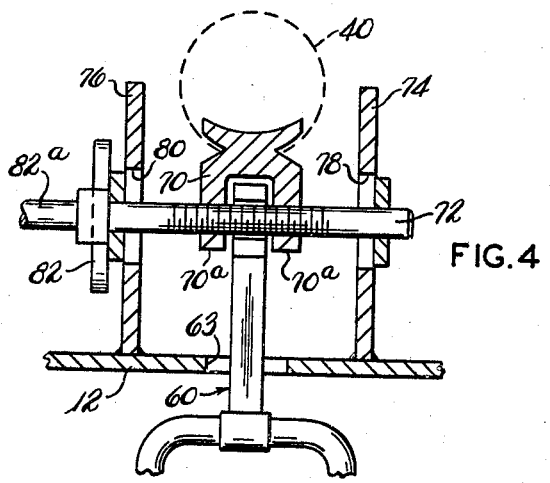
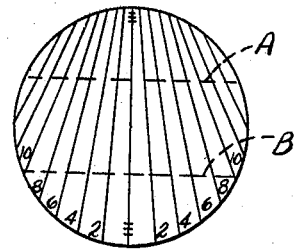
INVENTOR.
GENE L. TRUAX
BY Oldham & Oldham
ATTYS.

Dec. 9, 1969  G. L. TRUAX  3,482,317
FOOTBALL POSITION INDICATOR
Filed Oct. 12, 1966  2 Sheets-Sheet 2
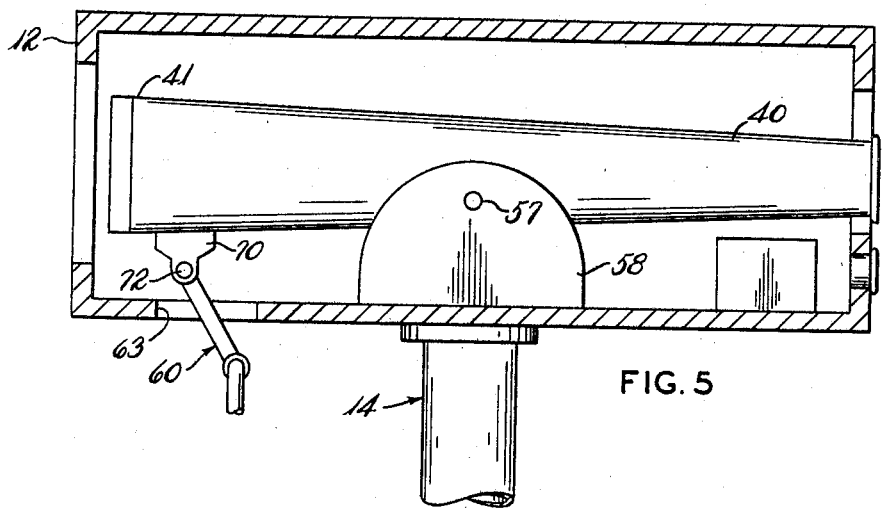
FIG. 5
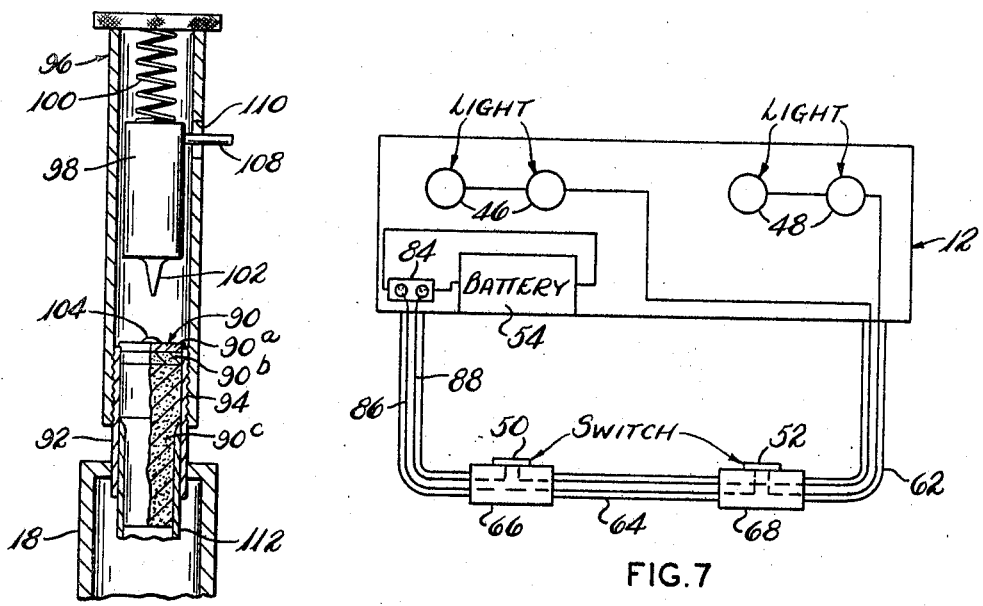
FIG. 6
FIG. 7
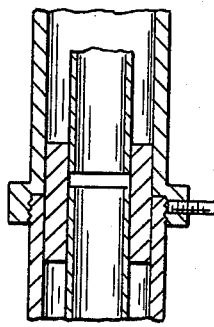
INVENTOR.
GENE L. TRUAX
BY
Oldham & Oldham
ATTYS.

United States Patent Office 3,482,317
Patented Dec. 9, 1969

3,482,317
FOOTBALL POSITION INDICATOR
Gene L. Truax, 2664 Sourek Road, Akron, Ohio 44313
Filed Oct. 12, 1966, Ser. No. 586,132
Int. Cl. G01c 15/12, 21/04, 21/10
U.S. Cl. 33—46    3 Claims

ABSTRACT OF THE DISCLOSURE

An aligning device for use in football games for determining the proper position of the football in relation to the sidelines and the linesman's chain stakes which utilizes sideline scopes in combination with a right angle prism to accurately position the device in parallel relationship to the sideline, and a pivotally mounted ball alignment scope mounted substantially perpendicular to the sideline scopes, and pivotal in a substantially vertical plane by manual adjustment to view the ball through the scope with respect to the sideline. The device also incorporates signal means to direct a football official on the field where to position the ball.

---

This invention relates to a device used by a linesman in a football game, and more particularly, to an aligning device used by football officials for quickly and accurately determining and indicating the proper position of the football in relation to the sidelines and the linesman's chain stakes.

It is the general object of the present invention to provide a device which accurately and quickly positions a football on the field by utilizing signal lights on the device which indicate to the officials in which direction the football should be moved to place it in intersection with a sightline projecting from the device and perpendicular to the sideline.

Another object of the present invention is to provide a football positioning device which incorporates means for positioning a chalk marker into the ground at the precise point at which the device is positioned on the sideline if and when the linesman must suddenly retreat his ground.

Referring to the drawings:

FIG. 1 is a perspective view of a preferred embodiment of the football positioning device of the invention;

FIG. 2 is a fragmentary diagrammatic view particularly illustrating the sighting device of the invention positioning a football on a sightline which is perpendicular to the sideline of the football field;

FIG. 3 is a diagrammatic plan view of the sighting device of the invention, particularly illustrating the means utilized to position the device in direct alignment with the sideline and the signal means of the device which indicate in which direction the football should be moved to place it in intersection with the sightline of the ball alignment scope;

FIG. 4 is a fragmentary end elevation, partially in cross section, of the mounting means of the ball alignment scope;

FIG. 5 is a broken away side elevation, partially in cross section, of the ball positioning device of the invention, particularly illustrating the ball alignment scope and the pivotal mounting means associated therewith;

FIG. 6 is a fragmentary vertical section of the support post of the positoning device, particularly illustrating the means utilized to drive a chalk dye onto the ground at the precise spot on the support post is positioned on the sideline;

FIG. 7 is a diagrammatic, fragmentary end elevation of the positioning device, particularly illustrating the means for selectively activating the signal lights of the device; and FIG. 8 is an illustration of the graduation scale used on the ball alignment scope to illustrate the spaced distance from alignment.

Now referring to the drawings in greater detail, and with particular reference to FIG. 1, the numeral 10 generally indicates the football position indicator or sighting device of the invention. Basically, it is comprised of a box-like frame 12 which has secured thereto and extending downwardly therefrom a post-like support member, which is generally indicated by the numeral 14. Actually the support member 14 consists of two slidably engageable legs or portions 16 and 18 which are adjustably interlocked as by clamps 20 and thumbscrews 22 which allow the height of the frame 12 to be adjusted according to the height of the official or linesman who will operate the positioning device as the football game is played. In order to position support member 14 into the ground substantially on or along the sideline of the football field, the bottom of the leg 18 is sharpened to facilitate sticking thereof into the ground and a support ring 23 is connected to the bottom portion of the leg 18 to act as a stop, and also to facilitate forcing the sharpened point into the ground with one's foot. In order to facilitate positioning of the frame 12 on the line of the ball without repositioning the support member 14, the frame may be provided with a limited sliding movement relative thereto.

Referring to the frame 12 in greater detail, reference should be had to FIGS. 2 and 3 which illustrate in diagrammatic fashion, the general way in which the positioning device of the invention works. Basically, the idea of the device is to position the frame 12 spaced from and parallel to the sideline 24 of a football field and to sight and position the football on a line perpendicular to the sideline. In order to insure that the frame 12 is positioned parallel to and vertically above the sideline of the football field, a right angle prism 26 is mounted to the frame 12. Eyepiece means 28 are also mounted in the frame 12 so that the official or operator may view the prism. Eyepiece means 29 are mounted to respective ends of the box so that the prism 26 acts as a reflecting member of any light rays which enter the eyepiece means 29 and impinge on the prism, the light rays from both ends being deflected by the prism at substantially a right angle through the eyepiece 28 so that they will meet the eye of the operator. The effect of prism 26 is exactly the same as the reflectors 130 and 131 in U.S. Patent No. 2,355,066. A pair of posts 30 and 32 are positioned at opposite ends of the sideline before the game and when the frame 12 is positioned along the sideline 24, as indicated by FIG. 2, it will be the images of these posts which deflect through the prism 26 to the eye of the operator. In order to enlarge the images of the posts 30 and 32, a pair of sideline scopes 34 and 36 mounted to the frame 12 are utilized.

The height of either scope 34 or 36 in the frame 12 will be above or below the other, as the case may be, a vertical distance about equal to the height of the scope, so the images projected by the scopes onto prism 26 will be adjacent each other in the vertical direction. As the operator peers into the prism 26 by looking through the eyepiece 28, the reflected image of the post 30, for example, will appear in the top half of the prism 26, and the reflected image of the sideline post 32 will appear in the bottom half of the prism. In order to position the frame 12 exactly parallel to the sideline, the operator merely slightly rotates or moves laterally the frame 12 until the images of the two posts are vertically aligned when viewed through the eyepiece 28. Such alignment is indicated by dotted line 38 of FIG. 3. After such parallel alignment has been obtained, the head linesman firmly steps on the ring member 24 to position the sighting device 10 of the invention in proper position along the sideline.

In order to position a football on a line perpendicular to the dotted line 38 and the sideline, a ball alignment scope 40 is pivotally mounted to the frame 12. An opening is provided in the frame 12 for the scope so that the operator can selectively peer either through the ball alignment scope 40 or through the eyepiece 28 at the prism 26. After the frame 12 has been properly positioned, as mentioned hereinbefore, the operator views through the ball alignment scope 40 until a football 42 is in a proper point of intersection with the sightline 44 of the ball alignment scope.

After an uncompleted pass or a penalty, for example, in order to return the football 42 to the proper point of intersection with the sightline 44, signal means are mounted to the frame means which can be selectively activated by the operator peering through the ball alignment scope 40, to indicate in which direction the football should be moved by the field officials to place it in a proper point of intersection with the sightline 44. The signal means consist of a pair of arrow-like lights 46 and 48 which are mounted on, but extend slightly outwardly from the frame 12. The lights 46 are connected through respective switches 50 and 52 to a suitable power source, such as a battery 54, which is mounted inside the frame 12. In the operation of the sighting device, if the operator wishes to indicate that the football 42 should be moved to the right in order to bring it in intersection with the sightline 44, the switch 52 is thrown to actuate the signal light 48. As is illustrated by FIG. 1, the light 48 works with a piece of arrow-shaped colored cover glass 55 to create a flashing arrow effect indicating that the football should be moved to the right.

If the football is moved too far to the right, and the operator wishes to indicate that the football should now be moved in the other direction, or to the left, he simply throws the switch 52 back to an off position and throws the switch 50 to actuate the signal light 46. The signal light 46 also works with a colored arrow-shaped cover plate 56 with the flashing arrow indicating that the football should be moved in a left direction. Once the football 42 has been moved into proper intersection with the sightline 44, the operator either flashes both lights 46 and 48 or waves his hands in the air indicating that the football should be spotted at precisely this point.

In order to raise or lower the ball alignment scope 40 so that the football 42 can be brought into the field of view of the scope, the scope is pivotally mounted to the frame 12 as by a pin 57 which extends between a pair of side flanges 58 welded to the frame 12. This is best illustrated by FIG. 5. A link means, generally indicated by the numeral 60 is pivotally secured to the objective end 41 of the ball alignment scope 40, as is illustrated by FIG. 1. The other end of the link means 60 is fixedly mounted to a hand grip bar 62 which extends substantially downwardly from the frame 12 and is connected thereto. A suitable slot 63 in the frame 12 allows the link means to pass between the ball alignment scope and the hand grip bar 62. A center portion 64 of the grip bar 62 has a pair of hand grips 66 and 68 provided thereon and it is to this center portion 64 that link means 60 actually connect. Center portion 64 is journalled for rotational movement while remaining in axial alignment with the remaining portions of the bar 62. The purpose of allowing rotation of this center portion 64 is so that rotation thereof by the operator effects pivotal movement of the scope whereby the scope can be moved slightly upwardly or downwardly to bring the football into the viewing field of the scope.

In order to insure that the scope is in precise perpendicular alignment with the sightline 38 of the sideline scopes 34 and 36, laterally adjusting mounting means for the objective end 41 of the scope, best illustrated by FIG. 4, are provided. Basically, these means consist of a forward end scope mount 70 which threadably receives a bolt 72 extending between and supported by a pair of vertically extending side flanges 74 and 76 which are welded to the frame 12. The bifurcated legs 70a of the scope mount 70 receive therebetween the end of the link means 60 which is slidably received on the threaded bolts 72. A pair of slots 78 and 80 are provided respectively in flanges 74 and 76 and these allow upward or downward movement of the bolt 72 as the ball alignment scope 40 is pivotally moved upwardly or downwardly as explained hereinbefore. The purpose of the threaded bolt 72 is to allow the lateral alignment of the scope 44 to be selectively adjusted by merely rotating a dial 82 so that the scope mount 70 can be selectively moved along the bolt 72 to bring the alignment of the scope 40 into proper perpendicular relationship with the sideline and with the sightline 38 of the sideline scopes. To assist in rotating dial 82, a shaft 82a removably thereto may be mounted to a knob 82b at the side of the frame 12, as seen in FIG. 1.

As mentioned briefly previously, when the signal device of the invention is used, the operator sights through the ball alignment scope 40 until the official on the field has moved the ball within the field of view of the scope. The ball alignment scope is provided with suitable cross hairs so that the operator sighting through the scope can determine the exact point at which the nose of the football should be positioned. In fact, as illustrated in FIG. 8, the ball alignment scope may be graduated with tapered lines indicating the number of inches to the center cross-hair from the ball at any position across the field. The dotted lines A and B indicate the hash marks on the field. In this manner the indicator can be accurately positioned with only one sighting. Some folding 12 inch rules 33 and 33a may be placed to normally lie along the shaft 18, but are pivoted at the lower end to assist in determining the exact number of inches to move the indicator when a specific spaced relation has been determined by the graduation of the ball alignment scope. A retractable 5 yard and 15 yard tape 35 may also be mounted on the base ring 23 to assist in exactly marking penalties from the indicator.

In order to indicate to the official on the field holding the ball which way it should be moved in order to intersect it with the cross-hairs of the alignment scope, signal lights 46 and 48 are provided which, when lighted, point in the direction that the football should be moved FIG. 7 diagrammatically illustrates the means utilized to effect activation of the signal lights. A suitable battery 54, for example, a dry cell 6-volt battery, is mounted to the frame 12 and provides power to outlet means 84 which is also mounted to the frame 12. Plugged into the outlet 84 are suitable leads 86 and 88 which are connected, respectively, to lights 46 and 48 mounted to the front portion of the sighting device. As is seen by FIG. 7, leads 86 and 88 rather than going directly from the outlet 84 to the respective lights, are directed through a hand grip bar 62 before returning back to the frame means and being connected to the signal lights.

The purpose of such an arrangement is to allow placement of pressure actuated switches 50 and 52 with the thumb of the hand on the associated grip to close the respective circuits to the lights. Since the operator, while using the positioning device will be grasping the handles and perhaps turning them to properly raise or lower the ball alignment scope 40 so that the football can be viewed, placing switches 50 and 52 on the hand grips 66 and 68, respectively, make it quite easy and convenient for him to light either light 46 or 48 with a steady or blinking action to signal to the official on the field in which direction the football should be moved.

In the course of the football game, sometimes it becomes necessary for the operator of the sighting device to retreat his ground because onrushing players are heading towards him at the sideline. In order to allow the operator to quickly mark the precise point at which the positioning device is located on the sideline before quitting his ground, as an important feature of the invention, a chalk dye firing device is incorporated into the supporting member 14 of the invention. This firing device is best illustrated by FIGS. 1 and 6. It is comprised of a cartridge member 90 which is adapted to be dropped down into and received by a hollow tubular member 92 which is mounted inside of and concentric with the leg 18 of the support member 14. As seen in the broken away portion, the cartridge 90 has a thin layer of primer 90a, a slightly thicker layer of black or other explosive propelled powder 90b, and the remainder filled with powdered dye 90c. A portion of the external peripheral surface of the tubular member 92 has suitable threads 94 provided thereon to allow an internally threaded cap, generally indicated by the numeral 96, to be screwed down thereon.

Received within the cap 96 is a spring tensioned firing pin 98 which may be forced in a downward direction by compression spring 100 so that the point 102 of the firing pin 98 can be impacted into contact with a primer 104 of the cartridge 90. As is best illustrated by FIG. 1, a vertically directed slot 106 is provided in the cap and adapted to extend therethrough is a substantially radially directed arm 108 which is secured to the firing pin 98. The purpose of the slot 106 and arm 108 is to allow the firing pin to be raised within the cap 96 by merely grasping the arm 108 and forcing the firing pin upwardly against compression spring 108 and then dropping the arm 108 down in a notched portion 110 of the slot 106. When the arm 108 has been positioned in the notch 110, as illustrated by FIG. 6 there is a sufficient clearance between point 102 of the firing pin and primer 104 on the cartridge 90 so that the cartridge can be fired by merely knocking the arm 108 out of the notch so that compression spring 100 drives the firing pin 98 and point 102 against the primer 104 of the cartridge.

In order to direct the dye 90c contained within the cartridge to the ground after the cartridge has been fired, a tube member 112 is connected with and forms a suitable extension of tubular member 92. Tube member 112, as is illustrated by FIG. 6, also is positioned inside of and concentric with the leg 18. Tubular member 112 is connected to a substantially jet-shaped opening chute 114 (see FIG. 1) which is positioned at the bottom portion of the leg 18. Thus, as can readily be visualized, firing cartridge 104 by knocking arm 108 out of notch 110 causes the dye powder 90c to shoot out of the jet 114 and into contact with the ground. This clearly marks on the ground with a circle of about 3 inches diameter the exact position where the support member 14 was positioned so that the operator can find his exact position on the sideline to enable him to reposition the sighting device of the invention. A suitable flexible chain 111 is connected to the cap 96 and to the leg 18 so that the cap 96 can be unscrewed and dropped away from the tube 92 when another cartridge is to be loaded therein.

Also connected to the frame 12 and extending substantially upwardly therefrom is a suitable cross bar 116 which carries a plurality of down marking cards 118 which can be easily flipped with either hand by the operator of the positioning device so that the spectators can determine what down is in play in the football game by referring to the cards. Of course, a suitable electrically lighted system indicating the downs could also be utilized.

It is seen that the objects of the invention have been accomplished by providing a positioning device which quickly and accurately positions the football on the field directly perpendicular to the sideline. It has been found that use of the positioning device of the invention greatly improves the accuracy of the positioning of the football. In fact, tests have shown that average errors of about 10 to about 18 inches are present with the standard method of eyeball sighting only. Average errors with the apparatus of the invention are about 1 to 2 inches. Many times these inches are extremely important to one or other of the football teams as the game is played and use of the sighting device makes for a much more exact, accurate and better played fooball game. Since the only extra equipment needed other than the actual sighting device itself is a pair of posts which are positioned at the ends of the field on the side line, the sighting device of the invention can be used in a practical manner with no need of extra equipment other than is presently provided. Also, officials can be instructed on the proper use of the sighting device of the invention in only a few minutes of time so that it is quick and convenient to use.

While a certain representative embodiment and details have been shown for the purpose of illustrating the invention, it will be apparent to those skilled in this art that various changes and modifications may be made therein without departing from the spirit or scope of the invention.

What is claimed is:

1. A sighting device for positioning a football on a sightline perpendicular to the sideline of the football field comprising, a frame, means for positioning said frame spaced from and parallel to the sideline, a ball alignment scope defining a sightline pivotally mounted to said frame, the sightline thereof being perpendicular to the frame, means to pivot the ball alignment scope in a substantially vertical plane without any movement of the frame which comprises a hand grip bar means secured to said frame and extending substantially downwardly therefrom, a portion of said bar being journalled for rotational movement while remaining in axial alignment with the balance of the bar means, link means pivotally connected to said rotatable portion of said bar means and to the viewing end of said scope whereby the operator can selectively effect pivotal movement of said scope by rotation of said portion of the bar means, signal means mounted to said frame means, and means for selectively activating said signal means to indicate in which direction the football should be moved to place it in a proper point of intersection with the sightline of the ball alignment scope.

2. A sighting device for positioning a football on a sightline according to claim 1 which includes a pair of switches mounted to said hand grip bar means to effect manual selective activation of said signal means by the operator while gripping the bar means to indicate in which direction the football should be moved to place it in a proper point of intersection with the sightline of the ball alignment scope.

3. A sighting device for positioning a football on a sightline according to claim 1, including means for selectively driving a chalk dye into the ground at the precise spot at which said frame is positioned on the sideline, said later named means being comprised of a hollow tubular support member extending downwardly from said frame, dye cartridge means removably contained within said support member, firing pin means, and means for selectively actuating said firing pin means to explode said cartridge to drive the dye through the support member to mark the ground on or adjacent to the sideline.

References Cited

UNITED STATES PATENTS

| | | | |
|---|---|---|---|
| 3,300,861 | 1/1967 | Lilly | 33—46.07 |
| 3,290,784 | 12/1966 | Goff et al. | 30—46.07 XR |
| 3,161,853 | 12/1964 | Hart | 340—332 XR |
| 2,085,807 | 7/1937 | Lindsey | 340—332 |
| 2,361,630 | 10/1944 | Jacobi | 340—332 |
| 2,493,491 | 1/1950 | MacMahon | 340—321 |
| 2,114,635 | 4/1938 | Marshall | 340—321 |
| 2,285,723 | 6/1942 | Kerrigan | 33—46.07 |

LEONARD FORMAN, Primary Examiner

STEPHEN L. STEPHAN, Assistant Examiner